United States Patent
Tanisho

(10) Patent No.: US 11,088,960 B2
(45) Date of Patent: Aug. 10, 2021

(54) INFORMATION PROCESSING APPARATUS AND VERIFICATION SYSTEM

(71) Applicant: FUJITSU LIMITED, Kawasaki (JP)

(72) Inventor: Motoyuki Tanisho, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 212 days.

(21) Appl. No.: 16/405,351

(22) Filed: May 7, 2019

(65) Prior Publication Data

US 2019/0356605 A1 Nov. 21, 2019

(30) Foreign Application Priority Data

May 17, 2018 (JP) .............................. JP2018-095247

(51) Int. Cl.
*H04L 12/863* (2013.01)
*H04L 12/865* (2013.01)
*H04L 12/911* (2013.01)
*H04L 12/851* (2013.01)

(52) U.S. Cl.
CPC ........ *H04L 47/628* (2013.01); *H04L 47/2483* (2013.01); *H04L 47/6275* (2013.01); *H04L 47/746* (2013.01)

(58) Field of Classification Search
CPC ..... H04L 41/00; H04L 41/0645; H04L 45/54; H04L 47/2483; H04L 47/6275; H04L 47/628; H04L 47/746
See application file for complete search history.

(56) References Cited

U.S. PATENT DOCUMENTS

| | | | | |
|---|---|---|---|---|
| 8,789,135 | B1* | 7/2014 | Pani ...................... | H04L 47/125 726/1 |
| 8,908,539 | B1* | 12/2014 | Pani ........................ | H04L 43/10 370/248 |
| 2013/0010600 | A1* | 1/2013 | Jocha .................... | H04L 43/062 370/236.2 |
| 2013/0128746 | A1* | 5/2013 | Yedavalli ................ | H04L 45/42 370/238 |
| 2014/0211795 | A1* | 7/2014 | Chiba ..................... | H04L 49/25 370/389 |
| 2014/0269731 | A1* | 9/2014 | DeCusatis ........... | H04L 47/6275 370/394 |

(Continued)

FOREIGN PATENT DOCUMENTS

JP 2016-152470 8/2016

*Primary Examiner* — Saad A. Waqas
(74) *Attorney, Agent, or Firm* — Fujitsu Patent Center

(57) ABSTRACT

An information processing apparatus includes a processor that obtains a flow table from a switch apparatus that processes packets by using the flow table. The processor creates, for each flow registered with the flow table, a verification packet based on identification information that identifies each flow. The processor determines a number of verification packets based on a count value that represents a number of actual packets that have arrived at the switch apparatus. The processor generates the number of verification packets for each flow by copying the verification packet created for each flow. The processor determines transmission order of the generated verification packets based on the count value for each flow and time information that represents a time when a final actual packet of each flow has arrived at the switch apparatus.

9 Claims, 15 Drawing Sheets

(56) References Cited

U.S. PATENT DOCUMENTS

| | | | |
|---|---|---|---|
| 2015/0163114 A1* | 6/2015 | Hsiao | H04L 43/10 |
| | | | 370/252 |
| 2016/0328159 A1* | 11/2016 | Coddington | G06F 13/4282 |
| 2016/0330113 A1* | 11/2016 | Chiba | H04L 69/22 |
| 2016/0359913 A1* | 12/2016 | Gupta | G06F 9/45558 |
| 2017/0070387 A1* | 3/2017 | Rao | H04L 41/0654 |
| 2017/0214609 A1* | 7/2017 | Fujii | H04L 43/10 |
| 2019/0158388 A1* | 5/2019 | Bianchi | H04L 45/56 |

\* cited by examiner

FIG. 2

| No. | MATCH CONDITION | PRIORITY | COUNT VALUE | INSTRUCTIONS | TIMEOUT VALUE | COOKIE |
|---|---|---|---|---|---|---|
| 1 | InPort=1, IP=192.168.247.0 | 0 TO 7 | 250 | OutPort=100 | 125012 | ... |
| 2 | InPort=1, IP=192.168.247.1 | 0 TO 7 | 41 | OutPort=101 | 97 | ... |
| 3 | InPort=2, IP=192.168.247.2 | 0 TO 7 | 65 | OutPort=102 | 5880 | ... |
| 4 | InPort=3, IP=192.168.247.3 | 0 TO 7 | 897 | OutPort=102 | 44000 | ... |
| 5 | InPort=4, IP=192.168.247.4 | 0 TO 7 | 3464 | OutPort=103 | 565 | ... |
| ... | ... | | | | | |
| N | InPort=5, IP=192.168.247.5 | 0 TO 7 | 36 | OutPort=107 | 487 | ... |
| ... | ... | | | | | |

FIG. 4

| No. | MATCH CONDITION | PRIORITY | COUNT VALUE | INSTRUCTIONS | TIMEOUT VALUE |
|---|---|---|---|---|---|
| 1 | InPort=1, IP=192.168.247.0 | 0 TO 7 | 250 | OutPort=100 | 125012 |
| 2 | InPort=1, IP=192.168.247.1 | 0 TO 7 | 41 | OutPort=101 | 97 |
| 3 | InPort=2, IP=192.168.247.2 | 0 TO 7 | 65 | OutPort=102 | 5880 |
| 4 | InPort=3, IP=192.168.247.3 | 0 TO 7 | 897 | OutPort=102 | 44000 |
| 5 | InPort=4, IP=192.168.247.4 | 0 TO 7 | 3464 | OutPort=103 | 565 |
| ... | | | | | |
| N | InPort=5, IP=192.168.247.5 | 0 TO 7 | 36 | OutPort=107 | 487 |
| ... | | | | | |

VERIFICATION PACKET 1: MAC | IPv4 | data — 192.168.247.0
VERIFICATION PACKET 2: MAC | IPv4 | data — 192.168.247.1
VERIFICATION PACKET N: MAC | IPv4 | data — 192.168.247.5

FIG. 6

| No. | MATCH CONDITION | PRIORITY | COUNT VALUE | INSTRUCTIONS | TIMEOUT VALUE |
|---|---|---|---|---|---|
| 1 | InPort=1, IP=192.168.247.0 | 0 TO 7 | 250 | OutPort=100 | 125012 |
| 2 | InPort=1, IP=192.168.247.1 | 0 TO 7 | 41 | OutPort=101 | 97 |
| 3 | InPort=2, IP=192.168.247.2 | 0 TO 7 | 65 | OutPort=102 | 5880 |
| 4 | InPort=3, IP=192.168.247.3 | 0 TO 7 | 897 | OutPort=102 | 44000 |
| 5 | InPort=4, IP=192.168.247.4 | 0 TO 7 | 3464 | OutPort=103 | 565 |
| ... | | | | | |
| N | InPort=5, IP=192.168.247.5 | 0 TO 7 | 36 | OutPort=107 | 487 |
| ... | | | | | |

PORT-1:
- No.1 MAC IPv4 data (250)
- No.2 MAC IPv4 data (41)
- No.3 MAC IPv4 data (33)
- No.X MAC IPv4 data (80)

PORT-m:
- No.1 MAC IPv4 data (10)
- No.2 MAC IPv4 data (90)
- No.3 MAC IPv4 data (55)
- No.X MAC IPv4 data (66)

FIG. 7

| No. (FLOW ENTRY) | MATCH CONDITION | PRIORITY | COUNT VALUE | INSTRUCTIONS | TIMEOUT VALUE |
|---|---|---|---|---|---|
| 1 | InPort=1, IP=192.168.247.0 | 0 TO 7 | 900,000 | OutPort=100 | 1,000,000 |
| 2 | InPort=1, IP=192.168.247.1 | 0 TO 7 | 200,000 | OutPort=101 | 600,000 |
| 3 | InPort=2, IP=192.168.247.2 | 0 TO 7 | 700,000 | OutPort=102 | 500,000 |
| 4 | InPort=3, IP=192.168.247.3 | 0 TO 7 | 50,000 | OutPort=102 | 200,000 |
| 5 | InPort=4, IP=192.168.247.4 | 0 TO 7 | 250,000 | OutPort=103 | 100,000 |

| PORT No. | COUNT VALUE [packets] | COUNT VALUE [bytes] |
|---|---|---|
| 1 | 2,100,000 | 1,250,000,000 |
| ⋮ | ⋮ | ⋮ |

FIG. 11A

|    | FLOW 1     | FLOW 2    | FLOW 3    | FLOW 4    | FLOW 5    |
|----|------------|-----------|-----------|-----------|-----------|
| 1  | 1.111(4)   | 3.000(14) | 0.714(2)  | 4.000(19) | 0.400(1)  |
| 2  | 2.222(10)  | 6.000     | 1.429(6)  | 8.000     | 0.800(3)  |
| 3  | 3.333(16)  | 9.000     | 2.142(9)  | 12.000    | 1.200(5)  |
| 4  | 4.444      | 12.000    | 2.856(13) | 16.000    | 1.600(7)  |
| 5  | 5.556      | 15.000    | 3.570(17) | 20.000    | 2.000(8)  |
| 6  | 6.667      | 18.000    | 4.284     | 24.000    | 2.400(11) |
| 7  | 7.778      | 21.000    | 4.998     | 28.000    | 2.800(12) |
| 8  | 8.889      | 24.000    | 5.712     | 32.000    | 3.200(15) |
| 9  | 10.000     | 27.000    | 6.426     | 36.000    | 3.600(18) |
| 10 | 11.111     | 30.000    | 7.140     | 40.000    | 4.000(20) |
| ⋮  | ⋮          | ⋮         | ⋮         | ⋮         | ⋮         |

FIG. 11B

| TRANSMISSION ORDER | FLOW | TRANSMISSION ORDER | FLOW |
|--------------------|------|--------------------|------|
| 1                  | 5    | 11                 | 5    |
| 2                  | 3    | 12                 | 5    |
| 3                  | 5    | 13                 | 3    |
| 4                  | 1    | 14                 | 2    |
| 5                  | 5    | 15                 | 5    |
| 6                  | 3    | 16                 | 1    |
| 7                  | 5    | 17                 | 3    |
| 8                  | 5    | 18                 | 5    |
| 9                  | 3    | 19                 | 4    |
| 10                 | 2    | 20                 | 5    |

...

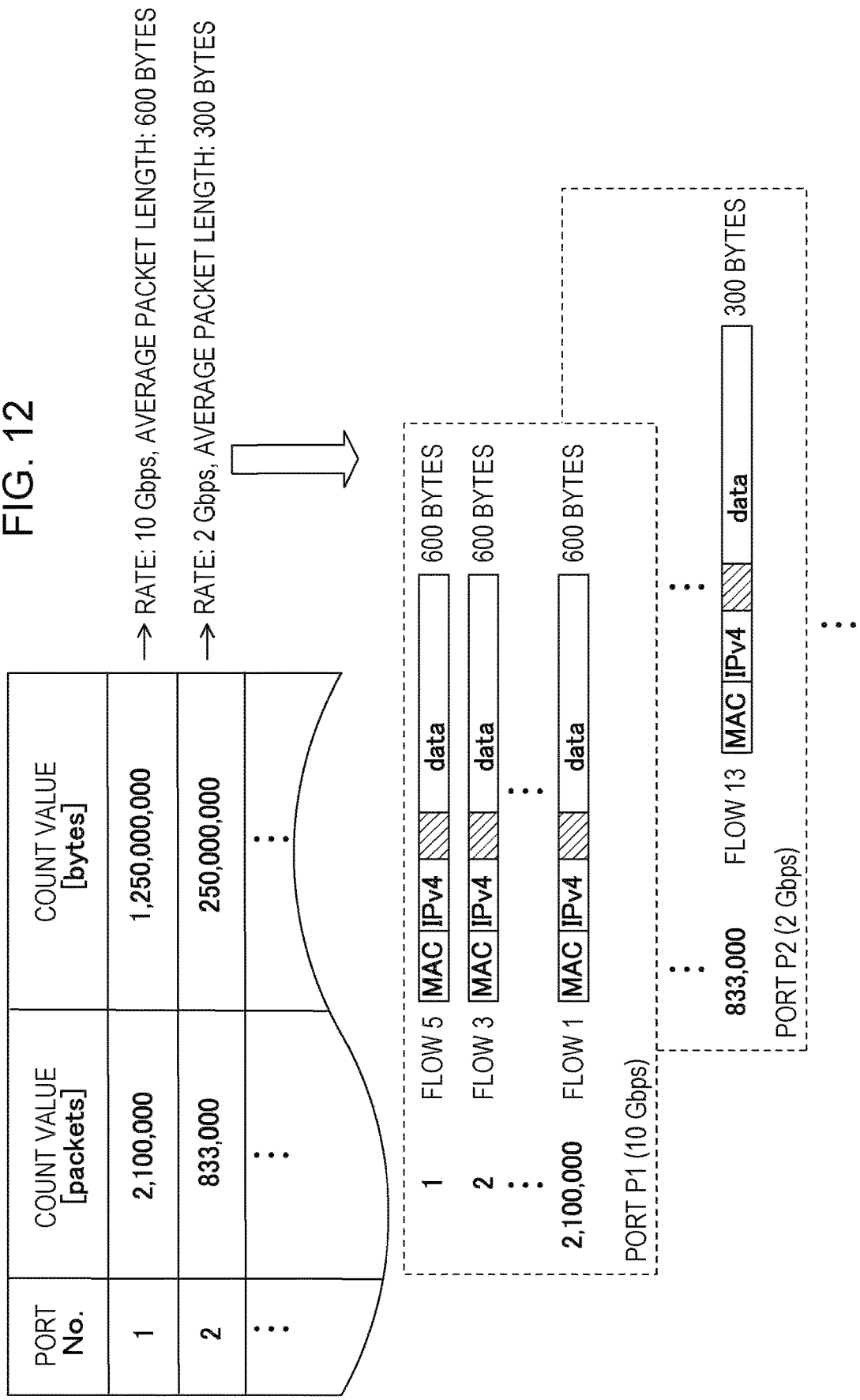

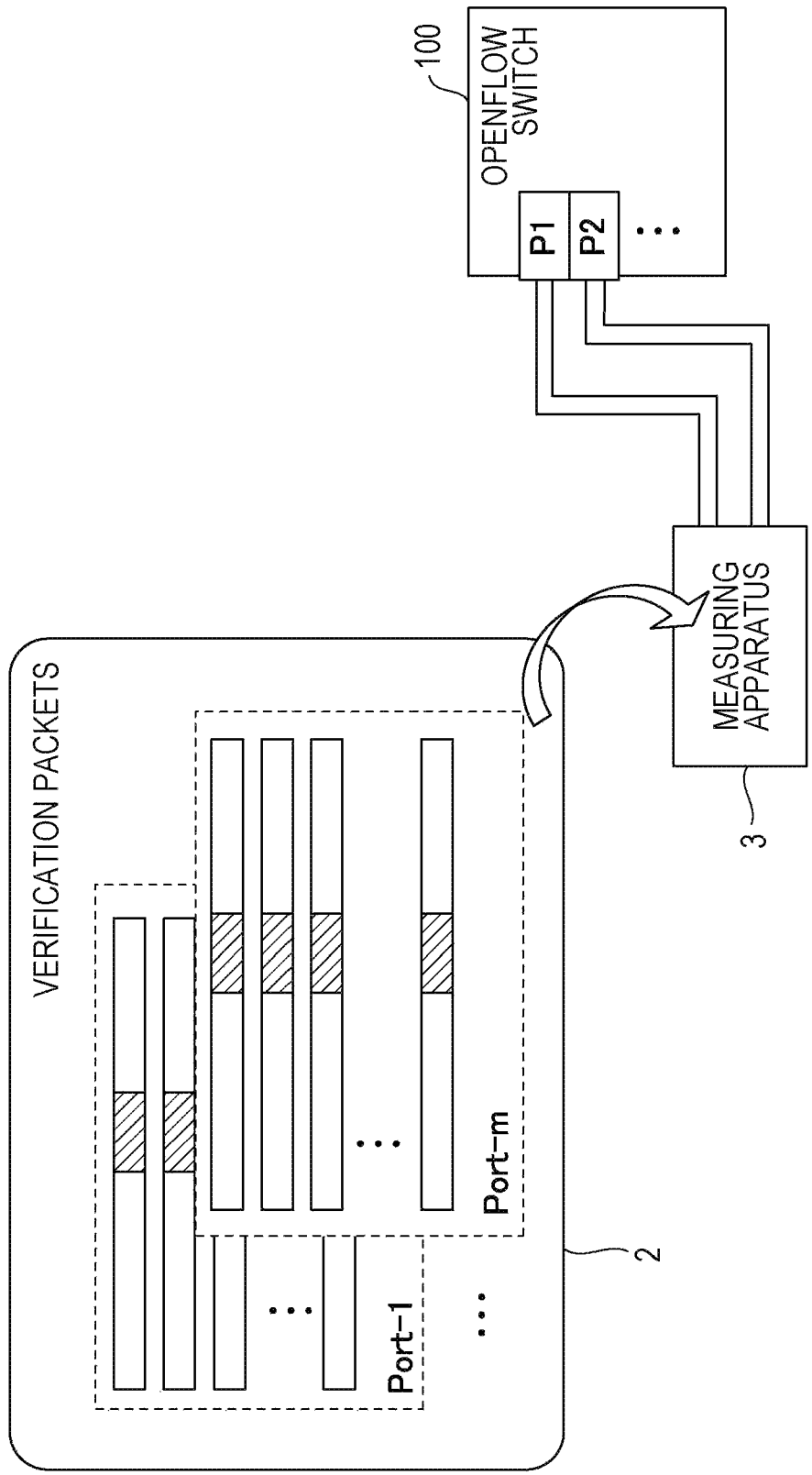

INFORMATION PROCESSING APPARATUS AND VERIFICATION SYSTEM

CROSS-REFERENCE TO RELATED APPLICATION

This application is based upon and claims the benefit of priority of the prior Japanese Patent Application No. 2018-95247, filed on May 17, 2018, the entire contents of which are incorporated herein by reference.

FIELD

The embodiment discussed herein is related to an information processing apparatus and a verification system.

BACKGROUND

When a failure occurs in a network, a system manager investigates a cause of the failure. For example, in a case where a failure occurs due to a change of a setting for a communication apparatus (such as a path change or a software update), a system manager obtains communication logs so that the cause of the failure may relatively easily be determined.

However, when a failure occurs even though no setting for the communication apparatus is changed, there is a possibility that the failure is caused due to the packet protocol type or the transfer amount of a packet. In this case, in order to reproduce the phenomenon, a verification packet equivalent to a packet flowing when the failure has occurred is desirably generated. By giving the verification packet to the communication apparatus considered as causing the failure, the cause of the failure may be investigated. The verification packet may be acquired by capturing a transfer packet in the communication apparatus, for example.

A method has been proposed that locates a failure position upon occurrence of a failure by using flow entry information set within a transfer apparatus.

Related techniques are disclosed in, for example, Japanese Patent Laid-open No. 2016-152470.

A method that acquires a verification packet by capturing a transfer packet involves continuously saving transfer packets in a storage for a long period of time. Then, in a high speed network, a huge storage is to be provided for saving transfer packets. For example, in a case where packets are to be captured in a switch apparatus having a processing capability ranging from several tens to several hundred Gbps, packets of several Gbytes are estimated to be stored per second even when the packets have a minimum packet size. Therefore, it is difficult for this method to realize preparation of verification packets. In addition, in a case where a high number of packets are saved in a storage, it is not easy to locate a storage area storing a packet relating to an occurring failure. Therefore, it is difficult for the technology to generate verification packets and reproduce packet processing by the communication apparatus.

SUMMARY

According to an aspect of the present invention, provided is an information processing apparatus including a memory and a processor coupled to the memory. The processor is configured to obtain a flow table from a switch apparatus that processes packets by using the flow table. The processor is configured to create, for each flow registered with the flow table, a verification packet based on identification information that is recorded in the flow table and identifies each flow. The processor is configured to determine a number of verification packets based on a count value that is recorded in the flow table for each flow and represents a number of actual packets that have arrived at the switch apparatus. The processor is configured to generate the number of verification packets for each flow by copying the verification packet created for each flow. The processor is configured to determine transmission order of the generated verification packets based on the count value for each flow and time information that is recorded in the flow table and represents a time when a final actual packet of each flow has arrived at the switch apparatus. The processor is configured to output the generated verification packets in the transmission order.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a flow table;

FIG. 4 is a diagram illustrating an example of a method for creating a verification packet for each flow;

FIG. 6 illustrates an example of processing for generating verification packets the number of which corresponds to a count value;

FIG. 7 is a diagram illustrating an example of a flow table;

FIGS. 11A and 11B are diagrams illustrating an example of a method for determining transmission order of verification packets;

FIG. 12 is a diagram illustrating an example of a method for adjusting packet lengths of verification packets;

FIG. 13 is a diagram illustrating an example of a method for verifying a switch apparatus by using generated verification packets;

DESCRIPTION OF EMBODIMENTS

Figure 1A:
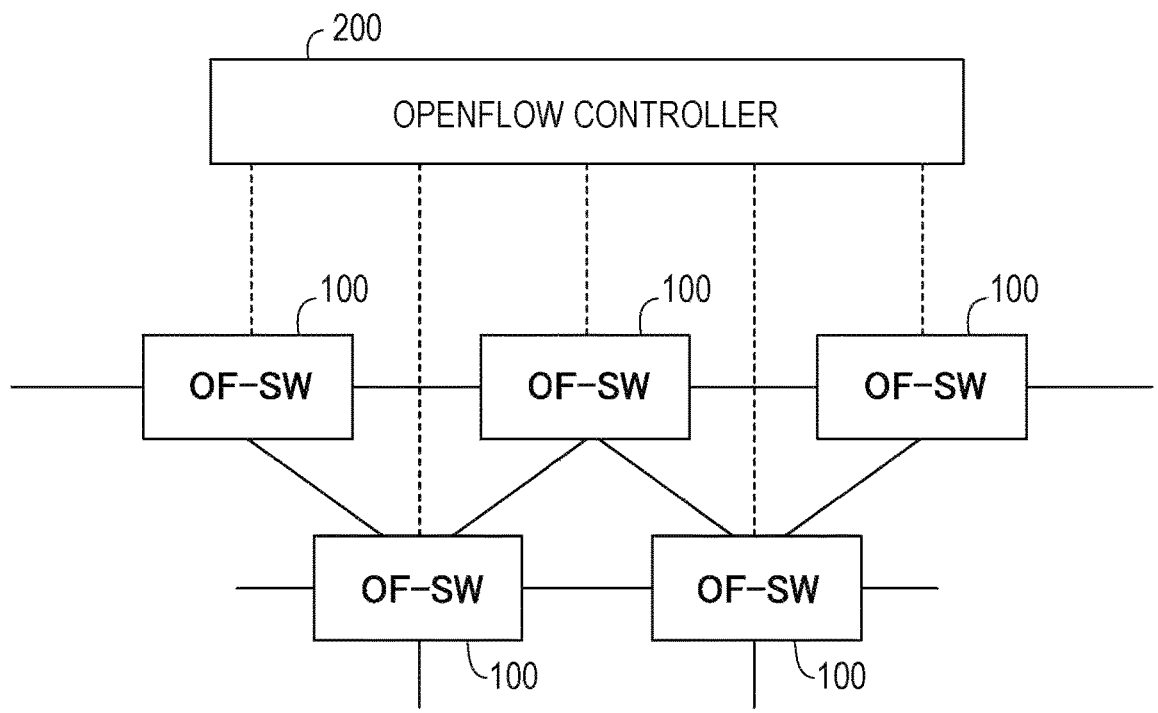
FIGS. 1A and 1B are diagrams illustrating examples of an OpenFlow network and an OpenFlow switch.

OpenFlow has been proposed and put into practice as one of technologies for establishing a flexible network. A network provided by OpenFlow includes a plurality of Open- Flow switches (OF-SWs) 100 and an OpenFlow controller 200, as illustrated in FIG. 1A. Each of the OpenFlow switches 100 processes packets based on settings by the OpenFlow controller 200.

Figure 1B:
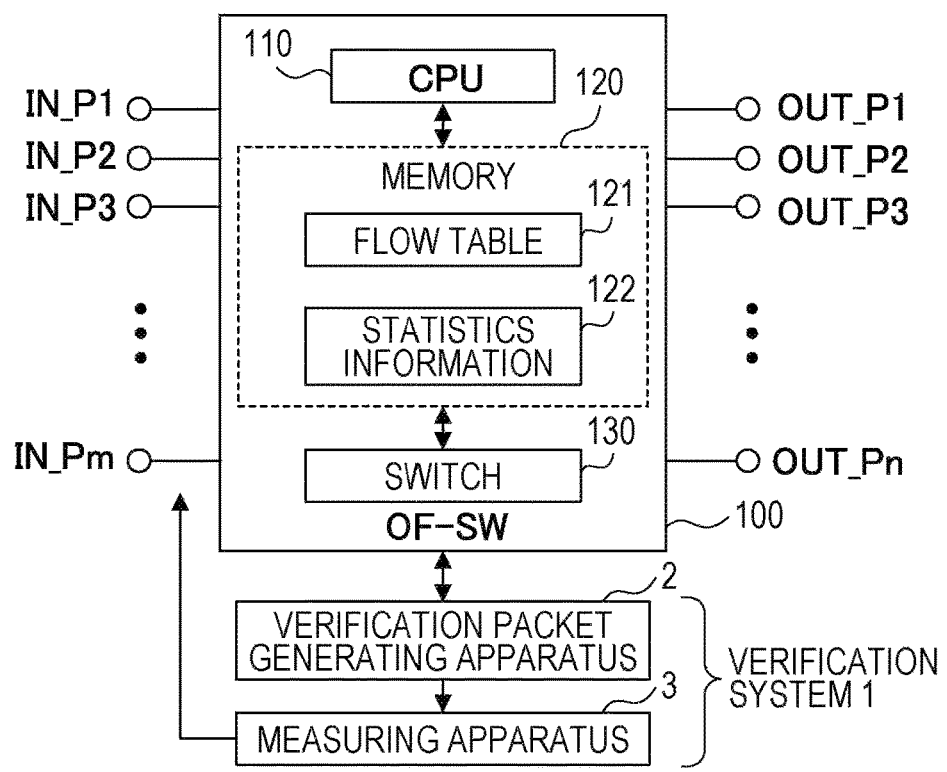

Each of the OpenFlow switches 100 includes a CPU 110, a memory 120, and a switch 130, as illustrated in FIG. 1B. Each of the OpenFlow switches 100 further includes a plurality of input ports P1 to Pm and a plurality of output ports P1 to Pn. The number of the input ports P1 to Pm and the number of the output ports P1 to Pn may be equal to or different from each other.

The CPU 110 creates a flow table 121 based on instructions given from the OpenFlow controller 200. The memory 120 stores the flow table 121 and statistics information 122. The statistics information 122 indicates packet processing executed by the OpenFlow switch 100. For example, the statistics information 122 indicates the number of packets having arrived at the OpenFlow switch 100 and a total information amount of the packets having arrived at the OpenFlow switch 100 for each input port. The switch 130 processes received packets based on the flow table 121.

The flow table 121 includes one or more flow entries. In each of the flow entries, a process performed on the corresponding flow is described. More specifically, for example, each of the flow entries includes "match condition" and "instructions". The match condition corresponds to identification information that identifies a flow to which a received packet belongs. The instructions describe a process to be performed on a received packet satisfying the match condition. The switch 130 then uses header information of the received packet to search a match condition in the flow table 121 and performs the corresponding process.

The OpenFlow controller 200 collectively manages the flow tables 121 in the OpenFlow switches 100. The OpenFlow controller 200 is capable of updating data in the flow table 121 in each of the OpenFlow switches 100. Thus, the OpenFlow controller 200 may control the configuration and operations of the network.

A verification system 1 is connected to each of the OpenFlow switches 100. Alternatively, the verification system 1 may be connected to one or more OpenFlow switches 100 designated by a user or a system manager.

The verification system 1 includes a verification packet generating apparatus 2 and a measuring apparatus 3. The verification packet generating apparatus 2 generates verification packets. The verification packets are used for verification of a behavior of the OpenFlow switch 100. More specifically, for example, the verification packets are used for reproduction of a behavior in the past of the Open Flow switch 100. Therefore, the verification packets are generated such that the verification packets have data equivalent to data of packets input to the OpenFlow switch 100 in the past. The verification packet generating apparatus 2 may generate verification packets for each input port of the OpenFlow switch 100. The measuring apparatus 3 gives the verification packets generated by the verification packet generating apparatus 2 to the OpenFlow switch 100. In this case, the measuring apparatus 3 gives the verification packets generated for each input port by the verification packet generating apparatus 2 to the corresponding input port.

When a failure occurs in the network, the verification packet generating apparatus 2 generates verification packets in accordance with instructions given by a user or a system manager. In this case, the user or the system manager designates a predetermined period immediately before the occurrence of the failure. Then, the verification packet generating apparatus 2 generates verification packets having data equivalent to data of packets input to the OpenFlow switch 100 during the designated predetermined period. The measuring apparatus 3 then gives the verification packets generated by the verification packet generating apparatus 2 to the OpenFlow switch 100. Thus, the behavior of the OpenFlow switch 100 upon occurrence of the failure is reproduced.

FIG. 2 illustrates an example of the flow table 121. The flow table 121 is implemented within each of the OpenFlow switch 100. The flow table 121 is created and is updated in accordance with instructions given from the OpenFlow controller 200.

The flow table 121 includes one or more flow entries. In each of the flow entries, a process to be performed on the corresponding flow is described. More specifically, for example, each of the flow entries includes "match condition", "priority", "count value", "instructions", "timeout value", and "cookie".

The match condition corresponds to identification information that identifies a flow to which a received packet belongs. In this example, the match condition includes information that identifies an input port and a destination IP address. The priority represents priority levels of each flow. The count value represents the number of received packets that satisfy the corresponding match condition. In other words, for example, the count value represents the number of packets having arrived at the OpenFlow switch 100 of each flow, and the instructions describe a process to be performed by the OpenFlow switch 100 on a received packet that satisfies the corresponding match condition. The timeout value is set to a predetermined value when a packet satisfying the corresponding match condition arrives at the OpenFlow switch 100. The timeout value decrements with time. Therefore, the timeout value corresponds to time information indicating the time when a final packet satisfying the corresponding match condition arrives at the OpenFlow switch 100. The cookie represents cookie information regarding the corresponding flow.

When a packet arrives at the OpenFlow switch 100, the switch 130 processes the packet based on the flow table 121. For example, a packet with a destination IP address "192.168.247.0" arrives at an input port P1 of the OpenFlow switch 100, the packet satisfies the match condition of the flow entry 1 on the flow table 121. In this case, the switch 130 processes the received packet based on the "instructions" in the flow entry 1. In other words, for example, the received packet is output via an output port P100. At that time, the "count value" in the flow entry 1 is incremented, and the "timeout value" in the flow entry 1 is set to a predetermined value. Furthermore, the statistics information 122 is updated.

Figure 3:
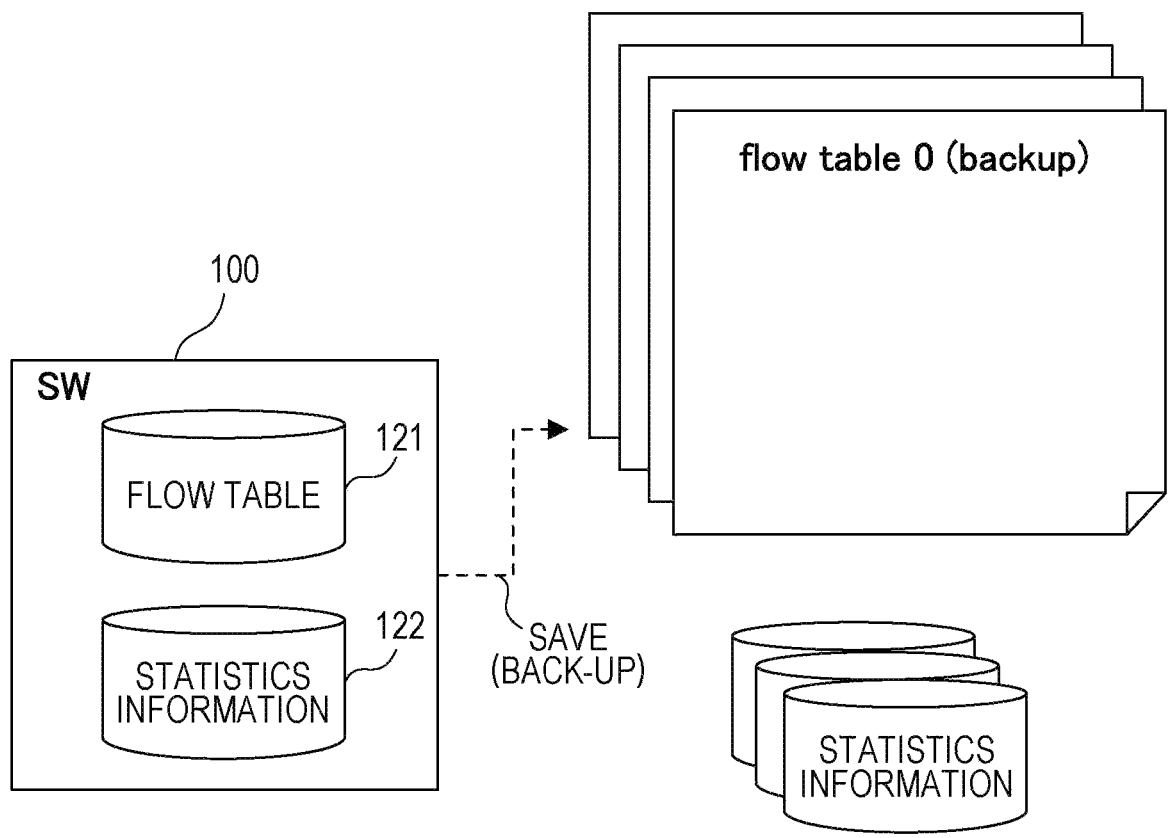
FIG. 3 is a diagram illustrating saving of a flow table and statistics information.

The flow table 121 and the statistics information 122 are periodically saved in the memory, as illustrated in FIG. 3. In other words, for example, backup files of the flow table 121 and statistics information 122 are created periodically (such as at intervals of one second). In this case, time information indicating the date and time when the flow table 121 and statistics information 122 are created is added to each of the backup files. The backup files may be saved in the memory implemented within the OpenFlow switch 100 or may be saved in a memory provided externally to the OpenFlow switch 100.

Next, a method for generating verification packets by the verification packet generating apparatus 2 will be described. The following description assumes that the verification packet generating apparatus 2 generates verification packets for verifying the OpenFlow switch 100 to be verified in accordance with instructions given from a user or a system manager. In this case, the verification packet generating apparatus 2 obtains the flow table 121 and the statistics information 122 from the OpenFlow switch 100 to be verified. The expression "obtains from the OpenFlow switch 100" includes an operation for obtaining backup files described with reference to FIG. 3.

The verification packets are generated to reproduce a behavior of the OpenFlow switch 100 during a designated time zone (target time zone), as described above. Thus, the verification packet generating apparatus 2 detects how packets have been input to the OpenFlow switch 100 during the target time zone. Here, the flow table 121 and the statistics information 122 indicate what kind of packet processing has been performed by the OpenFlow switch 100. For that reason, the verification packet generating apparatus 2 obtains the flow table 121 and the statistics information 122.

The flow table 121 and the statistics information 122 are periodically collected and saved as backup files, as described with reference to FIG. 3. Time information indicating the date and time when the flow table 121 and statistics information 122 are created is added to each of the backup files. Therefore, the verification packet generating apparatus 2 may easily obtain the flow table 121 and statistics information 122 indicating the packet processing by the OpenFlow switch 100 during the target time zone.

S1: Create Verification Packet

The verification packet generating apparatus 2 creates a verification packet corresponding to each of the flow entries on the flow table 121 as illustrated in FIG. 4. The OpenFlow switch 100 processes a received packet in accordance with the corresponding match condition recorded in the flow table 121. Thus, the verification packet generating apparatus 2 creates a verification packet based on the data of the match condition for each flow. For example, the match condition for the flow entry 1 includes a destination IP address "192.168.247.0". Therefore, "192.168.247.0" is set in a destination IP address field of a verification packet 1 corresponding to a flow entry 1. Also, "192.168.247.0" is set in a destination IP address field of a verification packet 2 corresponding to a flow entry 2. Any values may be set in the other fields within the verification packets because the fields are not referred in the Open Flow switch 100.

In the example above, the destination IP address of the verification packet 1 is "192.168.247.0". Therefore, when the verification packet 1 is given to the input port P1, the match condition for the flow entry 1 is satisfied in the OpenFlow switch 100. The OpenFlow switch 100 then outputs the verification packet 1 via the output port P100 based on the "instructions" for the flow entry 1.

S2: Allocate to Input Ports

Figure 5:
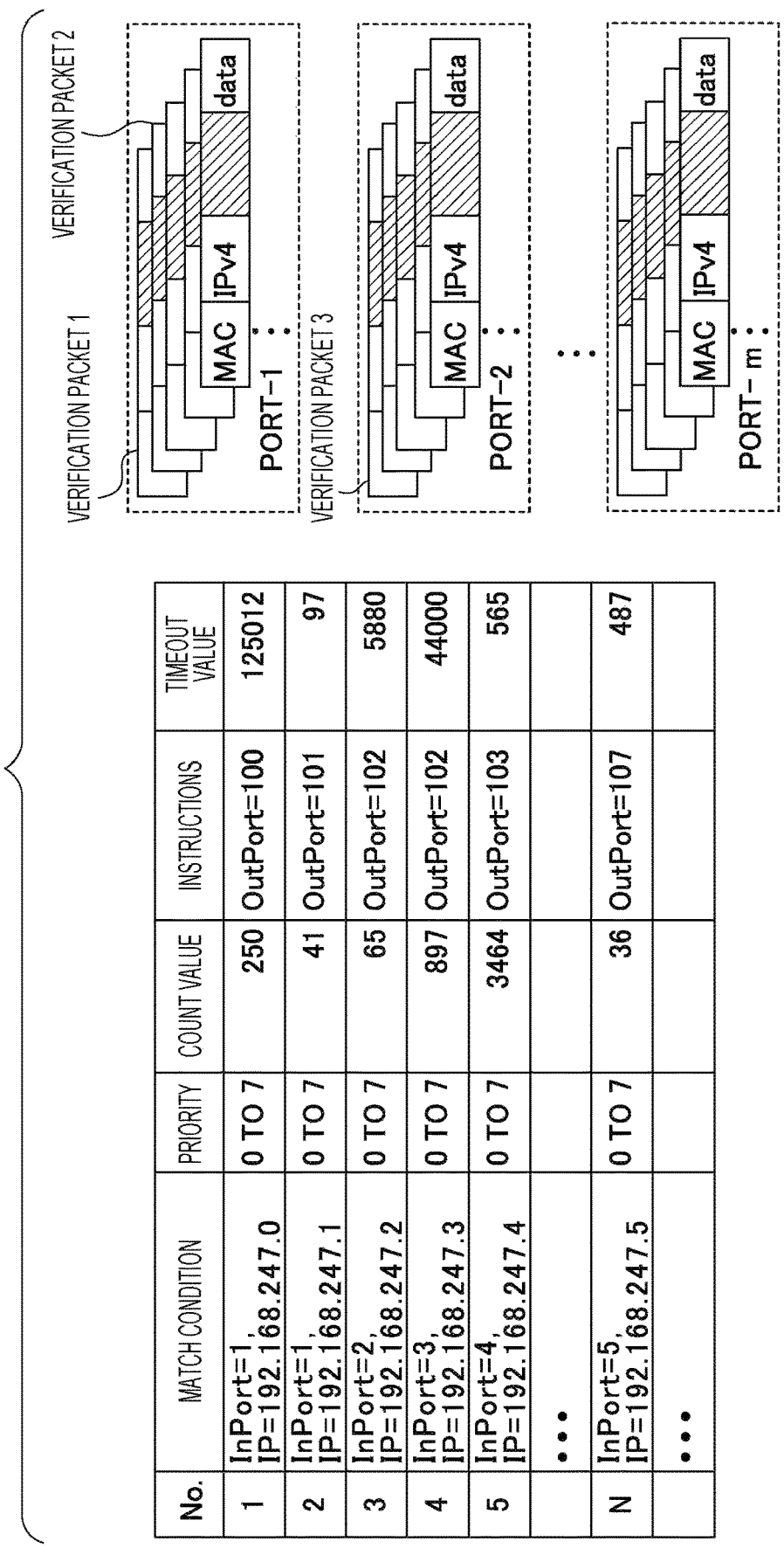
FIG. 5 is a diagram illustrating an example of processing for allocating verification packets to input ports.

The verification packet generating apparatus 2 allocates the verification packets created in S1 to the corresponding input ports of the OpenFlow switch 100 based on the match conditions recorded in the flow table 121. For example, as illustrated in FIG. 5, the match conditions for the flow entries 1 and 2 identify packets having arrived at the input port P1. Therefore, the verification packets 1 and 2 created based on the match conditions of the flow entries 1 and 2 are both allocated to the input port P1. The match condition for the flow entry 3 identifies packets having arrived at the input port P2. Therefore, a verification packet 3 created based on the match condition for the flow entry 3 is allocated to the input port P2.

S3: Generate Verification Packets

The verification packet generating apparatus 2 determines the number of verification packets to be generated based on the count value recorded in the flow table 121 for each flow. The verification packet generating apparatus 2 generates the determined number of verification packets based on the count value by copying the verification packet created for each flow in S1. In the example illustrated in FIG. 6, the count value for the flow entry 1 is 250, for example. The count value means that 250 packets belonging to the flow 1 have been input to the OpenFlow switch 100. Therefore, in this case, 250 verification packets 1 are generated for the flow 1. The verification packets 1 correspond to the verification packets "No. 1" allocated to the input port P1 in FIG. 6. The count value in the flow entry 2 is 41. In this case, 41 verification packets 2 are generated for the flow 2. The verification packets 2 correspond to the verification packets "No. 2" allocated to the input port P1 in FIG. 6.

In this manner, the verification packet generating apparatus 2 generates verification packets the number of which is equal to the count value recorded in the flow table 121. The count value represents the number of packets that have actually arrived at and been processed in the OpenFlow switch 100. Therefore, when an equal number of verification packets to the count value are generated and are given to the corresponding input port, the packet processing having been performed in the past by the OpenFlow switch 100 is reproduced.

However, the generation of an equal number of verification packets to the number of packets having been processed by the OpenFlow switch 100 in the past does not result in highly accurate reproduction of the packet processing having been performed by the OpenFlow switch 100 in the past. In other words, for example, the behavior of the OpenFlow switch 100 depends on "what type of packets has arrived at the OpenFlow switch 100 in what order". Therefore, the verification packet generating apparatus 2 estimates what type of packets has arrived at the OpenFlow switch 100 in what order in the past. The verification packet generating apparatus 2 determines the transmission order of verification packets based on the estimation result.

S4: Estimate Arrival Times

Figures 8, 9:
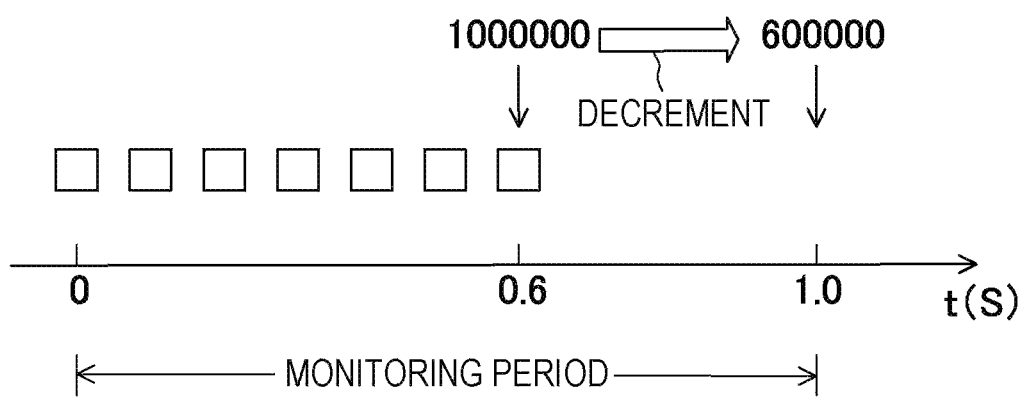
FIG. 8 is a diagram illustrating an example of statistics information.
FIG. 9 is a diagram illustrating an example of a method for estimating a time domain when packets are transmitted.

The verification packet generating apparatus 2 estimates arrival times of the packets having arrived at the OpenFlow switch 100 in the past based on the flow table 121 and the statistics information 122. The following description assumes that the flow table 121 illustrated in FIG. 7 and the statistics information 122 illustrated in FIG. 8 are saved in the memory. The flow table 121 illustrated in FIG. 7 and the statistics information 122 illustrated in FIG. 8 describe packet processing by the OpenFlow switch 100 during a monitoring period designated by a user or a system manager. The flow table 121 and statistics information 122 are collected for each monitoring period (such as one second) and are saved in the memory. In other words, for example, the verification packet generating apparatus 2 estimates arrival times of packets having arrived at the OpenFlow switch 100 during a designated monitoring period.

In the example illustrated in FIG. 7, five flows are registered with the flow table 121. In other words, for example, the flow table 121 includes flow entries 1 to 5. According to this embodiment, for simple description, processing to be performed for one input port (such as the input port P1) will be described. However, the verification packet generating apparatus 2 performs the processing in S4 for each of the input ports.

The timeout value recorded in the flow table 121 is set to a predetermined initial value when a packet satisfying the match condition arrives at the OpenFlow switch 100, as described above. In this case, the initial value is 1000000. The timeout value is decremented every 1 μsecond.

In the example illustrated in FIG. 8, the statistics information 122 describes that 2100000 packets have arrived at the input port P1 of the OpenFlow switch 100 within a monitoring period. This value is equal to a total of the count values in the flow table 121 illustrated in FIG. 7. The statistics information 122 describes that a total information amount of the packets having arrived at the input port P1 of the OpenFlow switch 100 within the monitoring period is equal to 1250000000 bytes.

The verification packet generating apparatus 2 determines a time domain when the packets have been transmitted within the monitoring period for each flow based on the timeout value recorded in the flow table 121. For example, as illustrated in FIG. 9, it is assumed that the monitoring period is one second. The initial value of the timeout value is 1000000, and the timeout value is decremented every one μsecond. In this case, every time a packet arrives at the OpenFlow switch 100, the timeout value is initialized to 1000000. After the final packet arrives at the OpenFlow switch 100 at a time "0.6", the timeout value is decremented every one μsecond. In this case, at the end time of the monitoring period, the timeout value is 600000. In other words, for example, the timeout value at the end time of the monitoring period represents the time when the final packet has arrived at the OpenFlow switch 100. Therefore, it is estimated that packets have been transmitted during a period from the "monitoring period start time (0)" to the "time (0.6) indicated by the timeout value at the end of the monitoring period".

Figure 10:
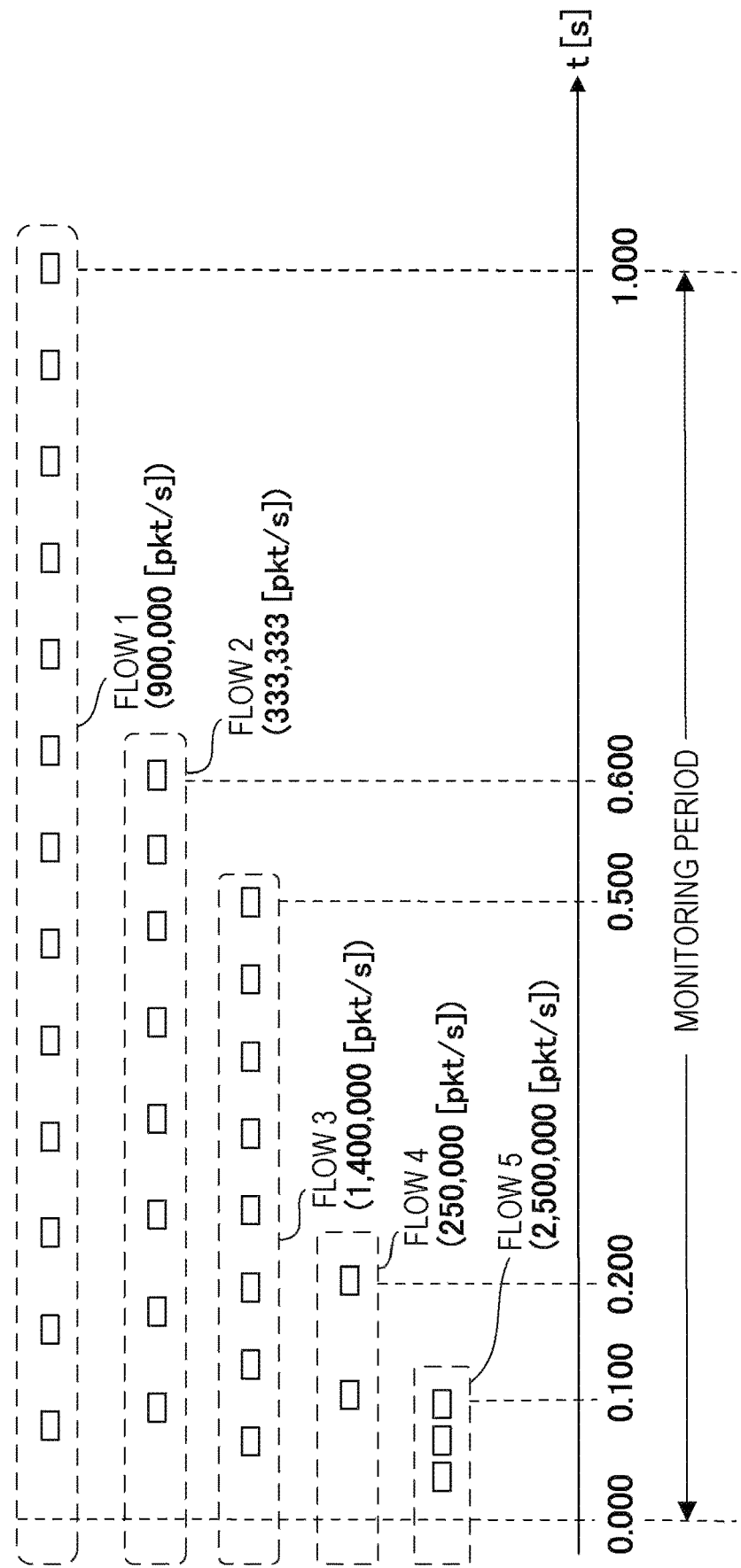
FIG. 10 is a diagram illustrating an example of a method for estimating arrival times of packets.

For example, in the flow table illustrated in FIG. 7, the timeout value of the flow entry 3 is 500000. This value indicates that the final packet satisfying the match condition of the flow 3 has arrived at the OpenFlow switch 100 when 500000 μseconds (or 0.500 seconds) have passed from the start time of the monitoring period. In other words, for example, the verification packet generating apparatus 2 estimates that packets corresponding to the flow 3 have been transmitted in a time domain of 0.000 to 0.500 seconds as illustrated in FIG. 10.

The verification packet generating apparatus 2 detects the number of packets having arrived at the OpenFlow switch 100 based on the count value recorded in the flow table 121. For example, the count value recorded for the flow entry 3 is 700000. In this case, it is estimated that, in the flow 3, 700000 packets have arrived at the OpenFlow switch 100 during a period from 0.000 to 0.500 seconds. It is assumed here that the packets are transmitted at equal intervals in each flow. Then, in the flow 3, the average packet rate in the period from 0.000 to 0.500 seconds is 1400000 packets/second as illustrated in FIG. 10.

Also, for each flow, the time domain when packets have arrived at the OpenFlow switch 100 and the average packet rate in the time domain are calculated. The calculation result for each flow is as follows. Flow 1: Packets have arrived at 900000 packets/second during a time domain from 0.000 to 1.000 seconds. Flow 2: Packets have arrived at 333333 packets/second during a time domain from 0.000 to 0.600 seconds. Flow 3: Packets have arrived at 1400000 packets/second during a time domain from 0.000 to 0.500 seconds. Flow 4: Packets have arrived at 250000 packets/second during a time domain from 0.000 to 0.200 seconds. Flow 5: Packets have arrived at 2500000 packets/second during a time domain from 0.000 to 0.100 seconds.

The verification packet generating apparatus 2 estimates the time when each of the packets has arrived at the OpenFlow switch 100. In other words, for example, the estimated arrival time of each of the packets is calculated. For example, in the flow 4, packets have arrived at the OpenFlow switch 100 at 250000 packets/second. Therefore, in the flow 4, the estimated arrival times of the first, second and third . . . packets are 4.000 μseconds, 8.000 μseconds, 12.000 μseconds, . . . , respectively.

In this manner, for each flow, the estimated arrival times of packets are calculated. The calculation result for each flow is as illustrated in FIG. 11A. According to this embodiment, estimated arrival times of packets within a monitoring period are recorded for each flow. The estimated arrival times are given relative to the start time of the monitoring period.

S5: Determine Transmission Order

The verification packet generating apparatus 2 determines the arrival order of packets based on the estimated arrival times of the packets. In the example illustrated in FIG. 11A, a packet having arrived at the OpenFlow switch 100 first within the monitoring period is determined as the first packet in the flow 5. The packet having arrived second is determined as the first packet in the flow 3. The packet having arrived third is determined as the second packet in the flow 5. The packet having arrived fourth is determined as the first packet in the flow 1. In the same manner, the arrival order of the subsequent packets is determined. Each of the numbers within parentheses illustrated in FIG. 11A represents the order of arrival of the corresponding packet at the OpenFlow switch 100. In this embodiment, the determination results from the first to 20th packets are illustrated.

Verification packets are generated instead of packets that have actually arrived at the OpenFlow switch 100. In other words, for example, when K packets have actually arrived at the OpenFlow switch 100 within a monitoring time, K verification packets are generated. When Ki packets belonging to a flow i (i=1, 2, 3, . . . ) have actually arrived at the OpenFlow switch 100, Ki verification packets are generated for the flow i. The transmission order of the verification packets is determined as the arrival order of the packets that have actually arrived at the OpenFlow switch 100.

FIG. 11B illustrates an example of a verification packet pattern representing the transmission order of verification packets. The verification packet pattern represents order for transmitting verification packets.

In this embodiment, as illustrated in FIG. 11A, the packet having arrived first at the OpenFlow switch 100 within a monitoring period belongs to the flow 5. Therefore, as illustrated in FIG. 11B, a verification packet 5 generated based on the match condition of the flow entry 5 is set as the first in the verification packet pattern. The packet having arrived second at the OpenFlow switch 100 belongs to the flow 3. Therefore, a verification packet 3 generated based on the match condition of the flow entry 3 is set as the second in the verification packet pattern. The packet having arrived third at the OpenFlow switch 100 belongs to the flow 5. Therefore, the verification packet 5 generated based on the match condition of the flow entry 5 is set as the third in the verification packet pattern. Thus, by arranging verification packets in the same manner, a verification packet pattern is created.

In this manner, the verification packet generating apparatus 2 determines the transmission order of verification packets based on the timeout values and count values recorded in the flow table 121.

S6: Determine Packet Length

The verification packet generating apparatus 2 calculates a transfer rate of each of the input ports of the OpenFlow switch 100 based on the statistics information 122. The statistics information 122 records a total information amount of packets having arrived at each of the input ports of the OpenFlow switch 100 within a predetermined monitoring period (such as one second) as illustrated in FIG. 12. Thus, the verification packet generating apparatus 2 may calculate a transfer rate of each of the input ports based on the statistics information 122. According to this embodiment, the transfer rates of the input ports P1 and P2 are 10 Gbps and 2 Gbps, respectively.

In addition, the verification packet generating apparatus 2 calculates an average packet length for each of the input ports based on the statistics information 122. As illustrated in FIG. 12, the statistics information 122 records the number of packets in addition to the total information amount for each of the input ports. The number of packets represents the number of packets having arrived at the OpenFlow switch 100. Thus, the verification packet generating apparatus 2 may calculate an average packet length for each of the input ports based on the statistics information 122. For example, the count value representing the total information amount is divided by the count value representing the number of packets so that an average packet length is calculated. In this embodiment, the average packet lengths of packets having arrived at the input ports P1 and P2 are 600 bytes and 300 bytes, respectively.

Then, the verification packet generating apparatus 2 adjusts the length of a data area of each of the verification packets for each of the input ports such that the length of each of the verification packets is equal to the corresponding average packet length. Each of the data areas is provided based on an arbitrary data pattern.

S7: Output Verification Packets

The verification packet generating apparatus 2 outputs the verification packets in the transmission order. In other words, for example, the verification packet generating apparatus 2 arranges the verification packets generated in S1 to S3 in the transmission order determined in S5 for each of the input ports. In the example illustrated in FIG. 12, verification packets are arranged such that a verification packet corresponding to the flow 5, a verification packet corresponding to the flow 3, . . . are given to the input port P1 in order. The data area of each of the verification packets is created such that the data area has a packet length equal to the average packet length calculated based on the statistics information 122. For example, the packet length of each of the verification packets to be given to the input port P1 is equal to 600 bytes.

The verification packets generated by the verification packet generating apparatus 2 are transmitted to the measuring apparatus 3 as illustrated in FIG. 13. Then, the measuring apparatus 3 transmits the verification packets to the OpenFlow switch 100. The verification packets are generated to be equivalent to the packets having actually input to the OpenFlow switch 100 in the past. Therefore, the measuring apparatus 3 may execute a test by reproducing the behavior of the OpenFlow switch 100 when the failure has occurred.

According to the verification packet generation method of this embodiment, verification packets are generated based on the flow table 121 and the statistics information 122. The flow table 121 and the statistics information 122 represent the packet processing that has been actually performed in the OpenFlow switch 100. Therefore, the verification packet generating apparatus 2 may generate verification packets equivalent to packets having actually input to the OpenFlow switch 100 by using the flow table 121 and the statistics information 122. The information amount of the flow table 121 and statistics information 122 for each monitoring period are about several Mbytes. Therefore, comparing with the configuration that stores packets having actually arrived at the OpenFlow switch 100, the storage space for generating verification packets may be significantly reduced.

Figure 14:
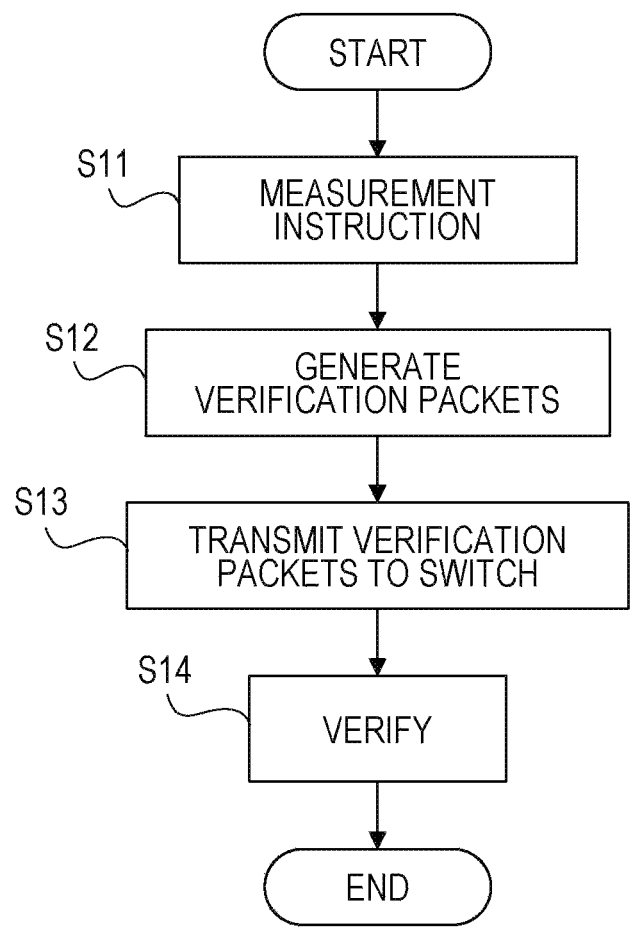
FIG. 14 is a flowchart illustrating an example of a procedure for verifying an operation by the switch apparatus.

FIG. 14 is a flowchart illustrating an example of a procedure for verifying an operation of the switch apparatus. It is assumed here that a failure has occurred in a network including the OpenFlow switch 100.

In S11, a measurement instruction is given to the verification packet generating apparatus 2. The measurement instruction designates a period for which a behavior of the OpenFlow switch 100 is to be reproduced, for example. In this case, for example, a predetermined period immediately before the time when the failure has occurred is designated.

In S12, the verification packet generating apparatus 2 generates verification packets. In this case, verification packets are generated that are equivalent to packets having actually arrived at the OpenFlow switch 100 during the period designated by the measurement instruction. The generated verification packets are given to the measuring apparatus 3.

In S13, the measuring apparatus 3 transmits the verification packets to the OpenFlow switch 100. The verification packets are generated to be equivalent to the packets that have actually input to the OpenFlow switch 100. Therefore, the OpenFlow switch 100 performs processing that is substantially the same as the processing having been performed immediately before the time when the failure has occurred. In other words, for example, the corresponding behavior of the OpenFlow switch 100 is reproduced.

In S14, the measuring apparatus 3 monitors the state of the OpenFlow switch 100. Thus, the processing by the OpenFlow switch 100 when the failure has occurred is verified.

The verification packet generating apparatus 2 may notify the measuring apparatus 3 of the transfer rate calculated for each flow in S4 above. In this case, the measuring apparatus 3 transmits the verification packets to the OpenFlow switch 100 based on the notified transfer rates. According to this method, the behavior by the OpenFlow switch 100 may be reproduced with high accuracy.

Figure 15:
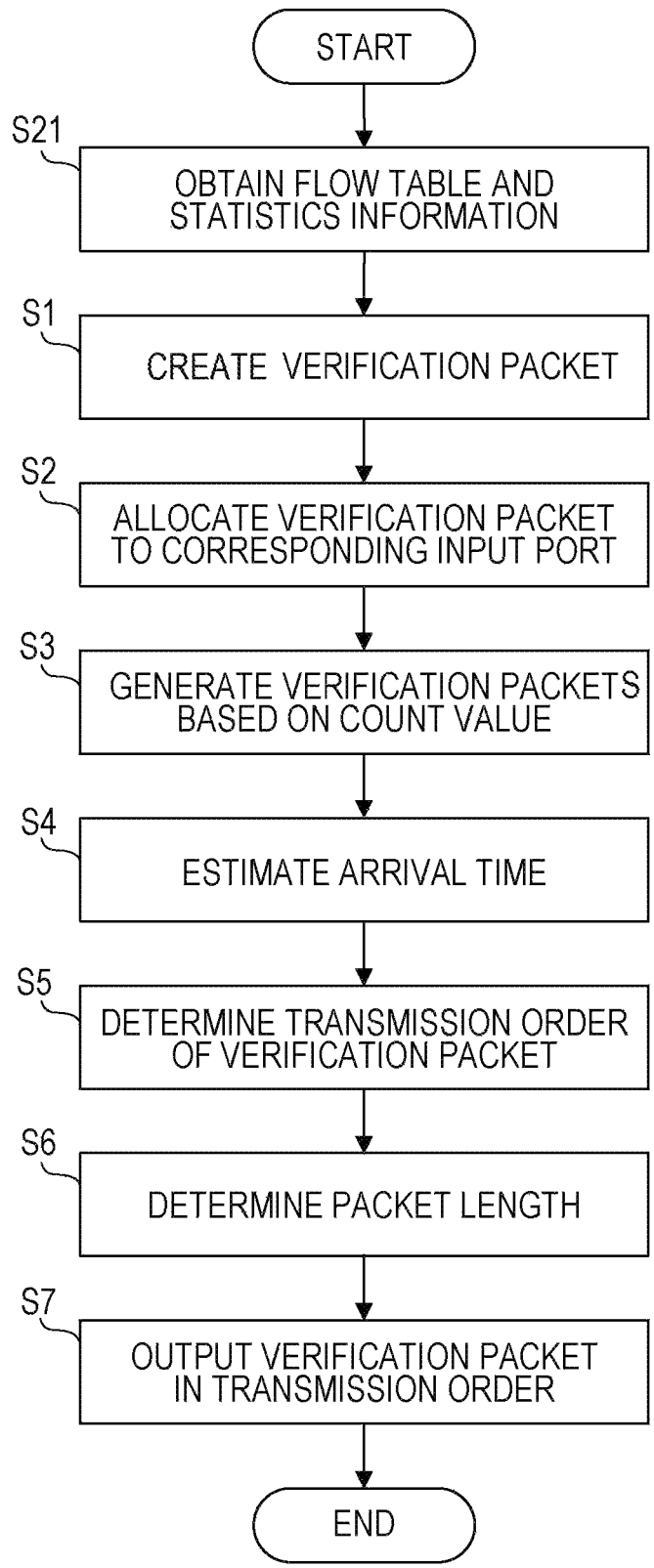
FIG. 15 is a flowchart illustrating an example of processing for generating verification packets.

FIG. 15 is a flowchart illustrating an example of processing for generating verification packets. The processing in the flowchart illustrated in FIG. 15 corresponds to S12 illustrated in FIG. 14.

In S21, the verification packet generating apparatus 2 obtains the flow table 121 and the statistics information 122. In this case, the verification packet generating apparatus 2 obtains the flow table 121 and statistics information 122 corresponding to the monitoring period designated by a user or a system manager. The processing in S1 to S7 is performed as described with reference to FIG. 4 to FIG. 12.

In the flowchart illustrated in FIG. 15, the steps may be executed in order different from the illustrated order. For example, the verification packet generating apparatus 2 may execute the processing in S4 to S6 before the processing in S1 to S3. In this case, the processing in S4 to S6 detects what type of packets has arrived at the OpenFlow switch 100 in what order during a designated monitoring period. Subsequently, in S1 to S3, verification packets equivalent to the packets detected in S4 to S6 are generated. The verification packets are output in the order detected in S4 to S6.

Figure 16:
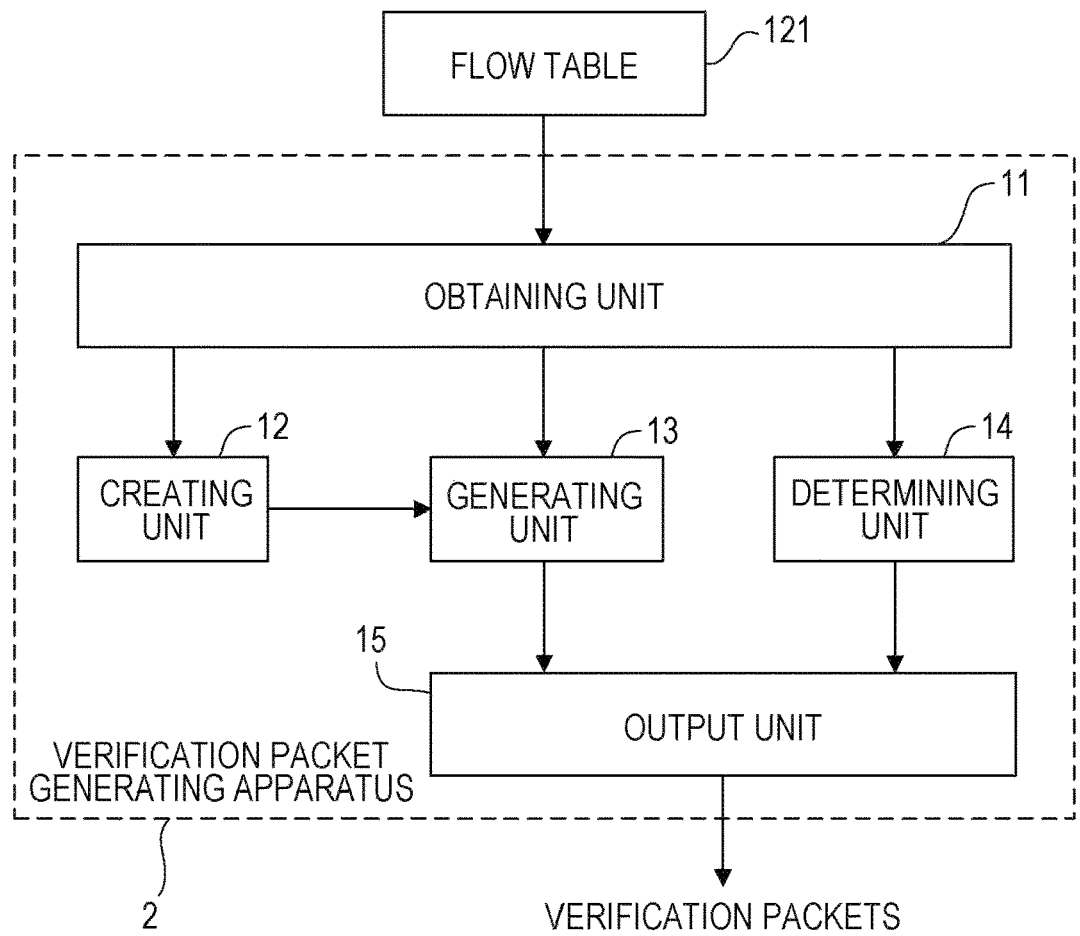
FIG. 16 is a diagram illustrating an example of a verification packet generating apparatus.

FIG. 16 illustrates an example of the verification packet generating apparatus 2. The verification packet generating apparatus 2 includes an obtaining unit 11, a creating unit 12, a generating unit 13, a determining unit 14, and an output unit 15. The verification packet generating apparatus 2 may include other functions not illustrated in FIG. 16.

The obtaining unit 11 obtains the flow table 121. The creating unit 12 creates a verification packet based on a match condition for each flow registered with the flow table 121. FIG. 4 illustrates an example of the processing by the creating unit 12. The generating unit 13 determines the number of verification packets based on the count value recorded in the flow table 121 for each flow and generates the determined number of verification packets by copying the verification packet created for each flow by the creating unit 12. FIG. 6 illustrates an example of the processing by the generating unit 13. The determining unit 14 determines the transmission order of the verification packets generated by the generating unit 13 based on the timeout values and count values recorded in the flow table 121. FIG. 7 to FIGS. 11A and 11B illustrate an example of the processing by the determining unit 14. The output unit 15 arranges and outputs the verification packets generated by the generating unit 13 in the transmission order determined by the determining unit 14. FIG. 12 and FIG. 13 illustrate an example of the processing by the output unit 15.

Figure 17:
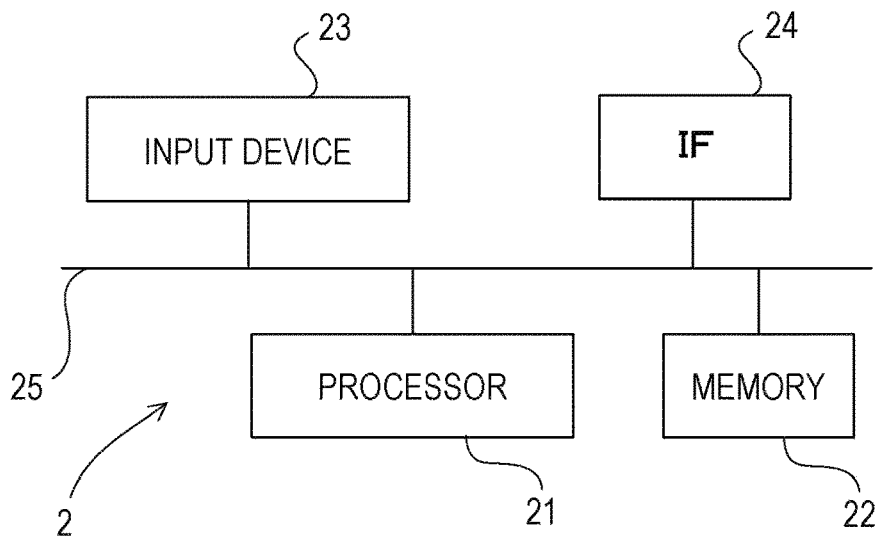
FIG. 17 is a diagram illustrating an example of a hardware configuration of the verification packet generating apparatus.

FIG. 17 is a diagram illustrating an example of a hardware configuration of the verification packet generating apparatus 2. The verification packet generating apparatus 2 is an information processing apparatus that includes a processor 21, a memory 22, an input device 23, and an interface device 24 as illustrated in FIG. 17. The processor 21, the memory 22, the input device 23, and the interface device 24 are mutually connected via one or more buses 25, for example.

The processor 21 provides the processing in the flowchart illustrated in FIG. 15 by executing a verification packet generation program stored in the memory 22. In other words, for example, the functions of the obtaining unit 11, the creating unit 12, the generating unit 13, the determining unit 14, and the output unit 15 are implemented by the processor 21. The memory 22 stores the verification packet generation program. In other words, for example, the memory 22 is an example of a computer-readable recording medium having stored therein the verification packet generation program. The memory 22 may temporarily save the flow table 121 and the statistics information 122. The input device 23 may be implemented by a keyboard, a mouse, a touch panel or the like. A user or a system manager may use the input device 23 to input instructions relating to generation of verification packets to the verification packet generating apparatus 2. The interface device 24 provides communication between the verification packet generating apparatus 2 and the OpenFlow switch 100 and communication between the verification packet generating apparatus 2 and the measuring apparatus 3.

The verification packet generating apparatus 2 may include other circuits or devices not illustrated in FIG. 17. For example, the verification packet generating apparatus 2 may include a device that reads digital information from a removable recording medium. In this case, the verification packet generating apparatus 2 may execute the verification packet generation program stored in the removable recording medium. A hardware configuration of the measuring apparatus 3 is similar to the hardware configuration of the verification packet generating apparatus 2 illustrated in FIG. 17.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
    obtaining a flow table from a switch apparatus that processes packets by using the flow table;
    creating, for each flow registered with the flow table, a verification packet based on identification information that is recorded in the flow table and identifies each flow;
    determining a number of verification packets based on a count value that is recorded in the flow table for each flow and represents a number of actual packets that have arrived at the switch apparatus;
    generating the number of verification packets for each flow by copying the verification packet created for each flow;
    determining transmission order of the generated verification packets based on the count value for each flow and time information that is recorded in the flow table and represents a time when a final actual packet of each flow has arrived at the switch apparatus; and
    outputting the generated verification packets in the transmission order, wherein, the process further comprises
    estimating an arrival time at which each of the actual packets has arrived at the switch apparatus based on the time information and the count value for each flow;
    determining arrival order in which each of the actual packets has arrived at the switch apparatus based on the estimated arrival time of each of the actual packets; and
    determining the transmission order of the generated verification packets in accordance with the arrival order of the actual packets.

2. The non-transitory computer-readable recording medium according to claim 1, the process further comprising:
    generating the verification packets for each of a plurality input ports included in the switch apparatus.

3. The non-transitory computer-readable recording medium according to claim 2, the process further comprising:
    obtaining, from the switch apparatus, statistics information indicating a number of actual packets having arrived at each of the input ports and an information amount of the actual packets having arrived at each of the input ports;
    calculating an average packet length of the actual packets based on the statistics information for each of the input ports; and
    adjusting a length of a data area of each of the verification packets for each of the input port such that the length of each of the verification packets is equal to the average packet length.

4. The non-transitory computer-readable recording medium according to claim 1,
    the process further comprising:
    setting, in a header of each of the verification packets, a destination address included in the identification information for a corresponding flow.

5. An information processing apparatus, comprising:
a memory; and
a processor coupled to the memory and the processor configured to:
obtain a flow table from a switch apparatus that processes packets by using the flow table;
create, for each flow registered with the flow table, a verification packet based on identification information that is recorded in the flow table and identifies each flow;
determine a number of verification packets based on a count value that is recorded in the flow table for each flow and represents a number of actual packets that have arrived at the switch apparatus;
generate the number of verification packets for each flow by copying the verification packet created for each flow;
determine transmission order of the generated verification packets based on the count value for each flow and time information that is recorded in the flow table and represents a time when a final actual packet of each flow has arrived at the switch apparatus; and
output the generated verification packets in the transmission order,
wherein
the processor is further configured to:
estimate an arrival time at which each of the actual packets has arrived at the switch apparatus based on the time information and the count value for each flow;
determine arrival order in which each of the actual packets has arrived at the switch apparatus based on the estimated arrival time of each of the actual packets; and
determine the transmission order of the generated verification packets in accordance with the arrival order of the actual packets.

6. The information processing apparatus according to claim 5, wherein
the processor is further configured to:
generate the verification packets for each of a plurality of input ports included in the switch apparatus.

7. The information processing apparatus according to claim 6, wherein
the processor is further configured to:
obtain, from the switch apparatus, statistics information indicating a number of actual packets having arrived at each of the input ports and an information amount of the actual packets having arrived at each of the input ports;
calculate an average packet length of the actual packets based on the statistics information for each of the input ports; and
adjust a length of a data area of each of the verification packets for each of the input port such that the length of each of the verification packets is equal to the average packet length.

8. The information processing apparatus according to claim 5, wherein
the processor is further configured to:
set, in a header of each of the verification packets, a destination address included in the identification information for a corresponding flow.

9. A verification system, comprising:
a first information processing apparatus including:
a first memory; and
a first processor coupled to the first memory and the first processor configured to:
obtain a flow table from a switch apparatus that processes packets by using the flow table;
create, for each flow registered with the flow table, a verification packet based on identification information that is recorded in the flow table and identifies each flow;
determine a number of verification packets based on a count value that is recorded in the flow table for each flow and represents a number of actual packets that have arrived at the switch apparatus;
generate the number of verification packets for each flow by copying the verification packet created for each flow; and
determine transmission order of the generated verification packets based on the count value for each flow and time information that is recorded in the flow table and represents a time when a final actual packet of each flow has arrived at the switch apparatus,
wherein
the first processor is further configured to:
estimate an arrival time at which each of the actual packets has arrived at the switch apparatus based on the time information and the count value for each flow;
determine arrival order in which each of the actual packets has arrived at the switch apparatus based on the estimated arrival time of each of the actual packets; and
determine the transmission order of the generated verification packets in accordance with the arrival order of the actual packets; and
a second information processing apparatus including:
a second memory; and
a second processor coupled to the second memory and the second processor configured to:
output the verification packets generated by the first information processing apparatus in the transmission order determined by the first information processing apparatus to the switch apparatus.

* * * * *